(12) United States Patent
Hayati (10) Patent No.: US 7,865,824 B1
(45) Date of Patent: Jan. 4, 2011

(54) SPELLING CORRECTION BASED ON INPUT DEVICE GEOMETRY

(75) Inventor: Katia Hayati, Sunnyvale, CA (US)

(73) Assignee: TellMe Networks, Inc., Mountain View, CA (US)

( * ) Notice: Subject to any disclaimer, the term of this patent is extended or adjusted under 35 U.S.C. 154(b) by 792 days.

(21) Appl. No.: 11/616,697

(22) Filed: Dec. 27, 2006

(51) Int. Cl.
*G06F 17/24* (2006.01)

(52) U.S. Cl. ............... 715/254; 715/256; 715/257; 715/259

(58) Field of Classification Search .......... 345/168; 715/254, 156, 257, 259, 256
See application file for complete search history.

(56) References Cited

U.S. PATENT DOCUMENTS

| | | | |
|---|---|---|---|
| 6,307,548 B1 * | 10/2001 | Flinchem et al. | 715/811 |
| 2002/0021311 A1 * | 2/2002 | Shechter et al. | 345/864 |
| 2003/0095105 A1 * | 5/2003 | Vaananen | 345/168 |
| 2005/0174333 A1 * | 8/2005 | Robinson et al. | 345/168 |
| 2005/0216278 A1 * | 9/2005 | Eisen | 705/1 |
| 2005/0278292 A1 * | 12/2005 | Ohi et al. | 707/1 |
| 2006/0123354 A1 * | 6/2006 | Volovitz | 715/780 |
| 2006/0167676 A1 * | 7/2006 | Plumb | 704/6 |
| 2007/0040813 A1 * | 2/2007 | Kushler et al. | 345/173 |

OTHER PUBLICATIONS

M. Bilenko and R. Mooney, "Adaptive Duplicate Detection Using Learnable String Similarity Measures", Proceedings of the Ninth ACM SIGDD International Conference on Knowledge Discovery and Data Mining (KD 2003), Washington DC, pp. 39-48, Aug. 2003.

* cited by examiner

*Primary Examiner*—Joshua D Campbell
*Assistant Examiner*—Christopher Bryant
(74) *Attorney, Agent, or Firm*—Perkins Coie LLP (57) ABSTRACT

A system receives a term from a device, where the term is input into the device via an input device. The system changes a spelling of the term based on a geometry of the input device.

10 Claims, 7 Drawing Sheets

```
┌─────────────────────────────────────┐
│         DICTIONARY MODULE           │
│              510                    │
└─────────────────────────────────────┘

┌─────────────────────────────────────┐
│      SPELLING CORRECTION MODULE     │
│              520                    │
└─────────────────────────────────────┘
```

SPELLING CORRECTION BASED ON INPUT DEVICE GEOMETRY

FIELD OF THE INVENTION

Implementations consistent with principles of the invention relate generally to spelling correction and, more particularly, to providing spelling correction based on the geometry of an input device.

BACKGROUND INFORMATION

Text searching is a popular way in which people obtain information of interest. When a search query contains one or more incorrectly spelled terms, the search results may not include information of interest to the person performing the search.

SUMMARY OF THE INVENTION

In accordance with one implementation consistent with principles of the invention, a method may include receiving a term from a device, where the term is input into the device via an input device; and changing a spelling of the term based on a geometry of the input device.

In another implementation, a system may include means for receiving a misspelled term from a device, the misspelled term being input into the device via an input device; and means for correcting a spelling of the term based on a geometry of the input device.

In still another implementation, a network device may include a memory configured to store instructions; and a processor configured to execute the instruction to receive a term from a device, the term being input into the device via an input device, and alter a spelling of the term based on a geometry of the input device.

In yet another implementation, a method may include receiving a term entered by an input device, where the input device is associated with a group of keys; and altering a spelling of the received term using a weighted distance technique, where a first weight is assigned to substitutions of characters associated with a same key of the input device, and at least a second weight is assigned to other substitutions of characters.

In still yet another implementation, a device may include a processor configured to receive a term entered by an input device, the input device being associated with a plurality of keys, and alter a spelling of the received term using a weighted distance technique, where a first weight is assigned to substitutions of characters associated with a same key of the input device, and at least a second weight is assigned to other substitutions of characters.

In another implementation, a computer-readable medium that stores instructions executable by at least one processor to perform a method for altering text. The computer-readable medium may include instructions for receiving the text, the text being entered by an input device that is associated with a plurality of keys; and instructions for altering a spelling of the received text using a weighted distance technique, where a first weight is assigned to substitutions of characters associated with a same key of the input device, and at least a second weight is assigned to other substitutions of characters.

BRIEF DESCRIPTION OF THE DRAWINGS

The accompanying drawings, which are incorporated in and constitute a part of this specification, illustrate one or more implementations of the invention and, together with the description, explain the invention. In the drawings.

DETAILED DESCRIPTION

The following detailed description of implementations consistent with principles of the invention refers to the accompanying drawings. The same reference numbers in different drawings may identify the same or similar elements. Also, the following detailed description does not limit the invention.

Exemplary Network Configuration

Figure 1:
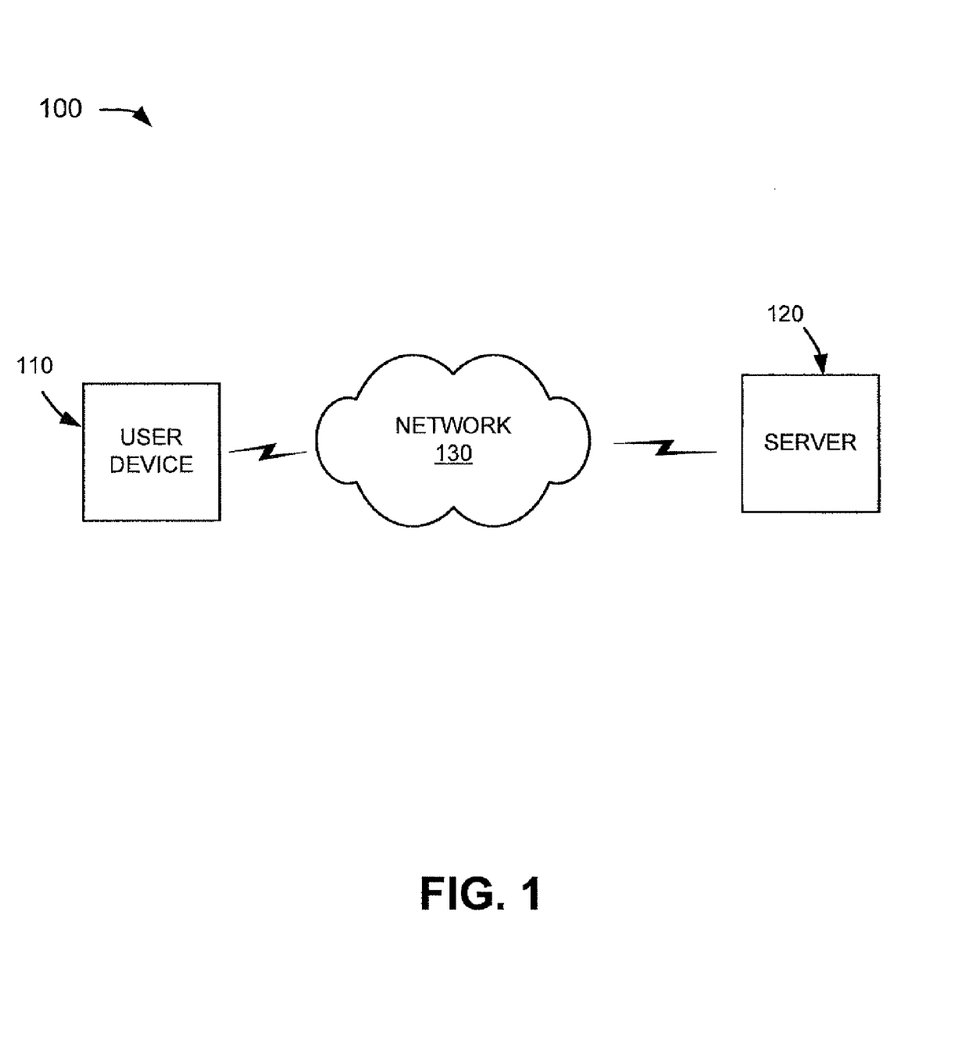
FIG. 1 is an exemplary diagram of a network in which systems and methods consistent with principles of the invention may be implemented.

FIG. 1 is an exemplary diagram of a network 100 in which systems and methods consistent with principles of the invention may be implemented. Network 100 may include a user device 110 connected to a server 120 via a network 130. One user device 110 and one server 120 have been illustrated as connected to network 130 for simplicity. In practice, there may be more user devices and/or servers. Also, in some instances, a user device may perform one or more functions of a server and a server may perform one or more functions of a user device.

User device 110 may include one or more entities. An entity may be defined as a device, such as a personal computer, a personal digital assistant (PDA), a laptop, or another type of computation or communication device, a thread or process running on one of these devices, and/or an object executable by one of these devices. In one implementation, user device 110 may include a cell phone or another type of device in which a user enters text using a triple tapping technique. Server 120 may include one or more server entities that gather, process, search, and/or provide information in a manner consistent with principles of the invention.

Network 130 may include a local area network (LAN), a wide area network (WAN), a telephone network, such as the Public Switched Telephone Network (PSTN) or a cellular telephone network, an intranet, the Internet, or a combination of networks. User device 110 and server 120 may connect to network 130 via wired, wireless, and/or optical connections.

Exemplary User Device Configuration

Figure 2:
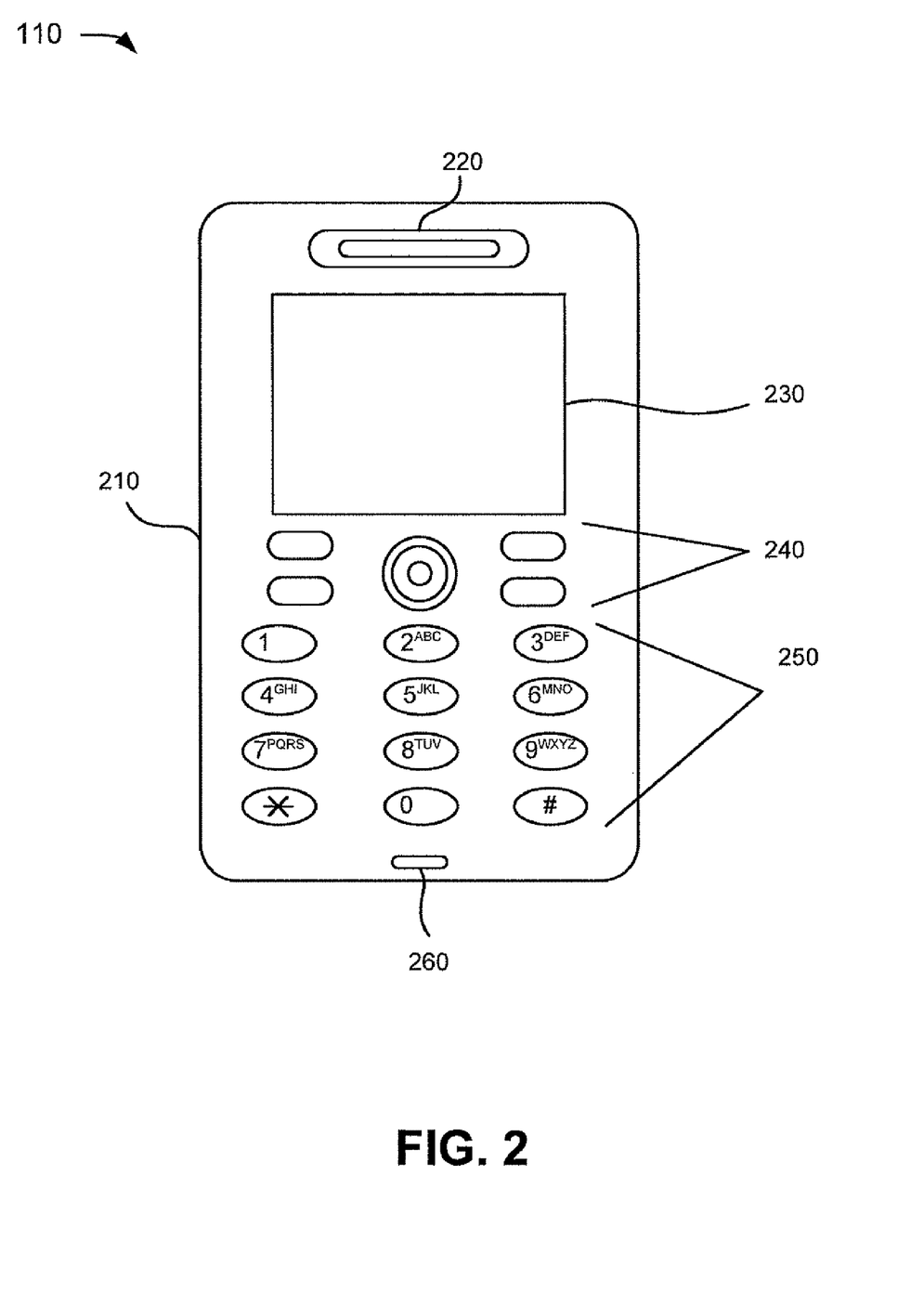
FIG. 2 is an exemplary front view of a user device of FIG. 1.

FIG. 2 is an exemplary front view of user device 110 in one implementation consistent with principles of the invention. As shown in FIG. 2, user device 110 may include a housing 210, a speaker 220, a display 230, control buttons 240, a keypad 250, and a microphone 260. Housing 210 may protect the components of user device 120 from outside elements. Speaker 220 may provide audible information to a user of user device 120.

Display 230 may provide visual information to the user. For example, display 230 may display text input into user device 110, text and/or graphics received from another device, such as server 120, and/or information regarding incoming or outgoing calls, media, games, phone books, the current time, etc. Control buttons 240 may permit the user to interact with user device 120 to cause user device 120 to perform one or more operations. For example, control buttons 240 may be used to cause user device 110 to transmit information, such as a search query. Keypad 250 may include a standard telephone keypad. As illustrated, keys in keypad 250 may be associated with one or more characters. For example, key "2" is associated with the letters "A," "B," and "C." Using triple tapping, a user of user device 110 may enter the letter "C" by, for example, depressing the "2" key three times. Microphone 260 may receive audible information from the user.

Figure 3:
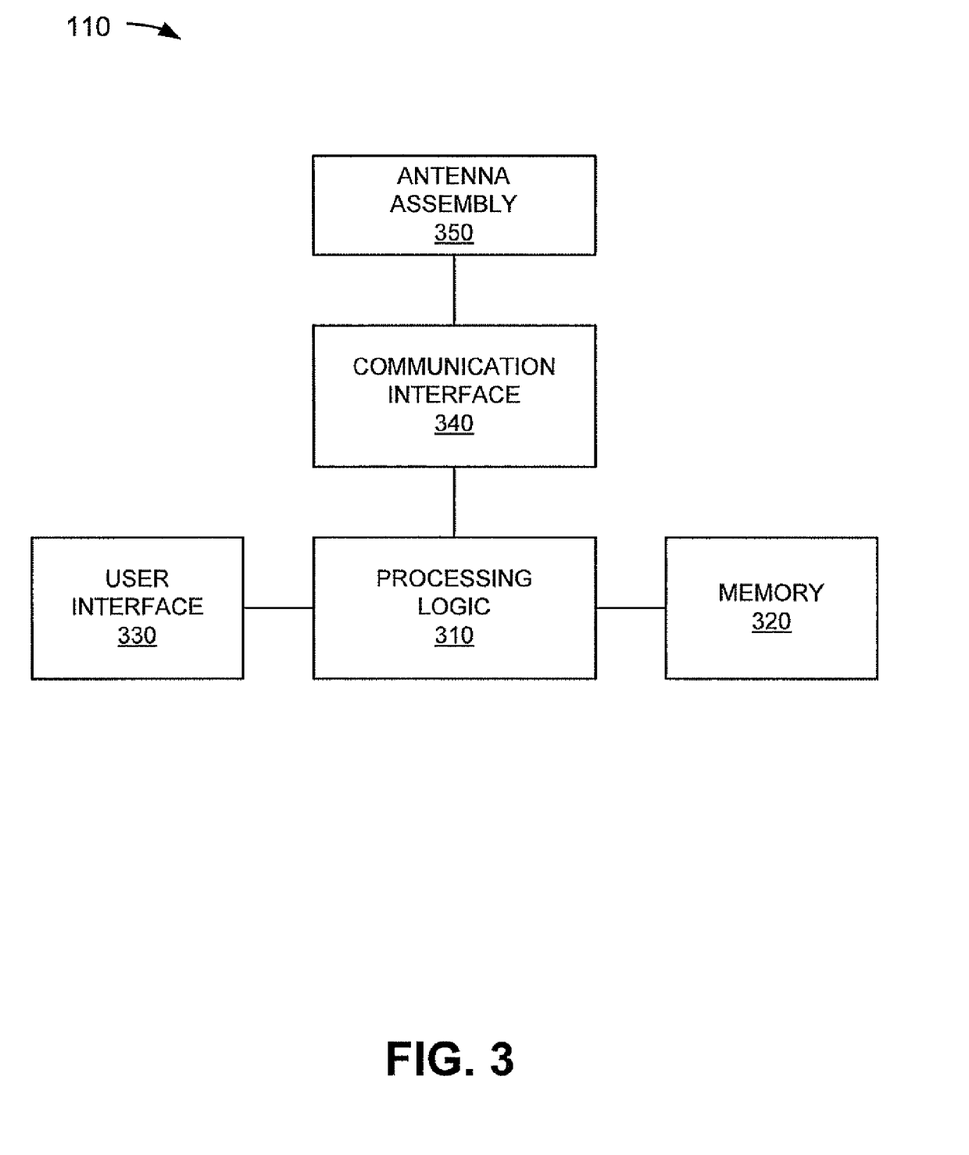
FIG. 3 is a diagram of exemplary components of the user device of FIG. 2.

FIG. 3 is a diagram of exemplary components of user device 110. As shown in FIG. 3, device 110 may include processing logic 310, memory 320, a user interface 330, a communication interface 340, and an antenna assembly 350. Processing logic 310 may include a processor, microprocessor, an application specific integrated circuit (ASIC), field programmable gate array (FPGA), or the like. Processing logic 310 may control operation of user device 110 and its components. Memory 320 may include a random access memory (RAM), a read only memory (ROM), and/or another type of memory to store data and instructions that may be used by processing logic 310.

User interface 330 may include mechanisms for inputting information to user device 110 and/or for outputting information from user device 110. Examples of input and output mechanisms might include buttons (e.g., control buttons 240, keys of keypad 250, a joystick, etc.) to permit data and control commands to be input into user device 110; a speaker (e.g., speaker 220) to receive electrical signals and output audio signals; a microphone (e.g., microphone 260) to receive audio signals and output electrical signals; a display (e.g., display 230) to output visual information (e.g., text input into user device 110); and/or a vibrator to cause user device 110 to vibrate.

Communication interface 340 may include, for example, a transmitter that may convert baseband signals from processing logic 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals. Antenna assembly 350 may include one or more antennas to transmit and/or receive RF signals over the air. Antenna assembly 350 may, for example, receive RF signals from communication interface 340 and transmit them over the air and receive RF signals over the air and provide them to communication interface 340. In one implementation, for example, communication interface 340 may communicate with a network, such as network 130.

As will be described in detail below, user device 110 may perform certain operations in response to processing logic 310 executing software instructions of an application contained in a computer-readable medium, such as memory 320. A computer-readable medium may be defined as a physical or logical memory device and/or carrier wave. The software instructions may be read into memory 320 from another computer-readable medium or from another device via communication interface 340. The software instructions contained in memory 320 may cause processing logic 310 to perform processes that will be described later. Alternatively, hard-wired circuitry may be used in place of or in combination with software instructions to implement processes consistent with principles of the invention. Thus, implementations described herein are not limited to any specific combination of hardware circuitry and software.

Exemplary Server Configuration

Figure 4:
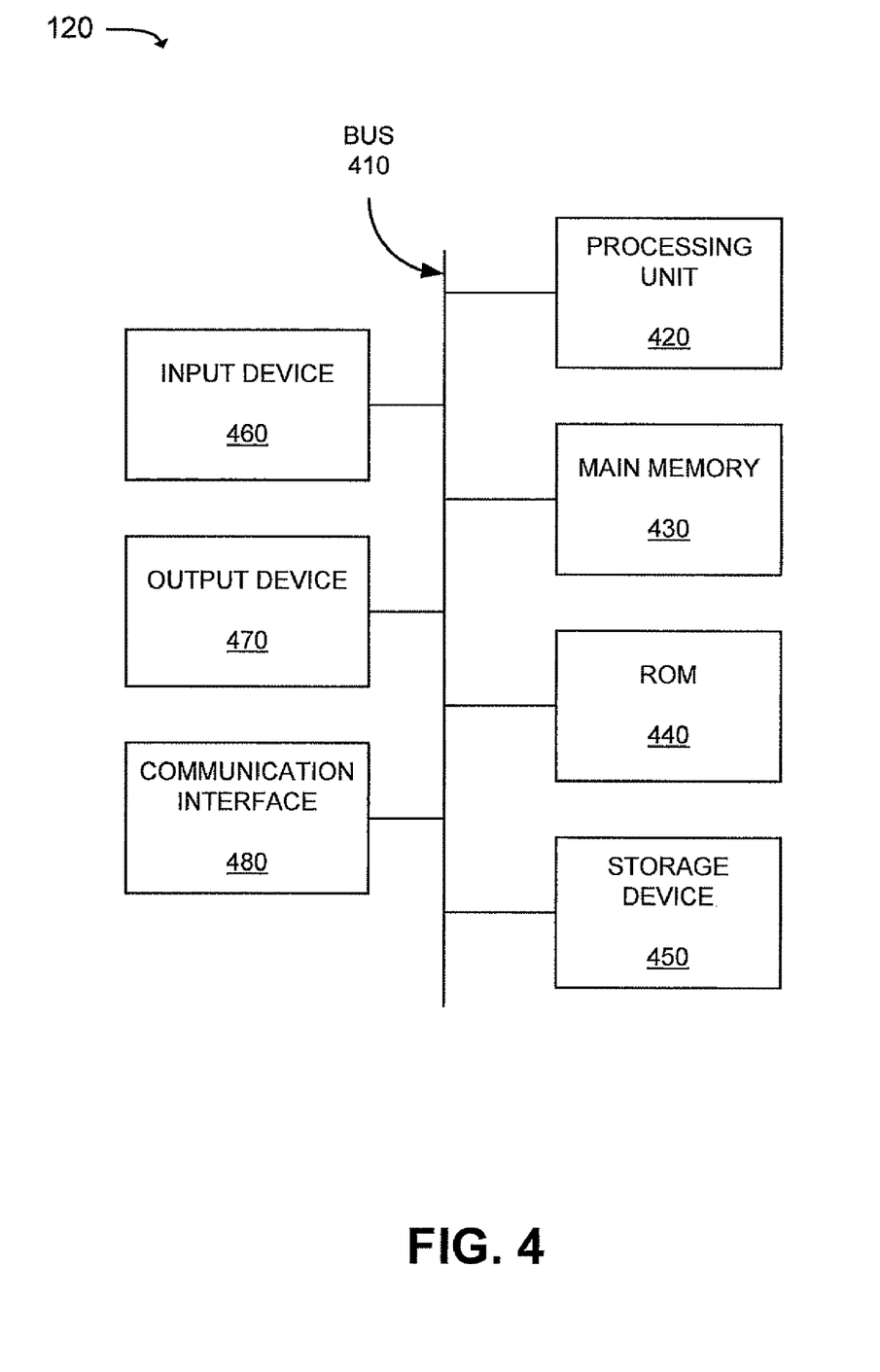
FIG. 4 is an exemplary diagram of a server of FIG. 1.

FIG. 4 is an exemplary diagram of server 120 in an implementation consistent with principles of the invention. As illustrated, server 120 may include a bus 410, a processing unit 420, a main memory 430, a ROM 440, a storage device 450, an input device 460, an output device 470, and a communication interface 480. Bus 410 may include a path that permits communication among the elements of server 120.

Processing unit 420 may include a processor, microprocessor, or other type of processing logic that may interpret and execute instructions. Main memory 430 may include a RAM or another type of dynamic storage device that may store information and instructions for execution by processing unit 420. ROM 440 may include a ROM device or another type of static storage device that may store static information and/or instructions for use by processing unit 420. Storage device 450 may include a magnetic and/or optical recording medium and its corresponding drive.

Input device 460 may include a mechanism that permits an operator to input information to server 120, such as a keyboard, a mouse, a pen, a microphone, voice recognition and/or biometric mechanisms, etc. Output device 470 may include a mechanism that outputs information to the operator, including a display, a printer, a speaker, etc. Communication interface 480 may include any transceiver-like mechanism that enables server 120 to communicate with other devices and/or systems. For example, communication interface 480 may include mechanisms for communicating with another device or system via a network, such as network 130.

As will be described in detail below, server 120, consistent with principles of the invention, may perform certain spelling correction-related operations. Server 120 may perform these and other operations in response to processing unit 420 executing software instructions contained in a computer-readable medium, such as main memory 430. The software instructions may be read into main memory 430 from another computer-readable medium, such as storage device 450, or from another device via communication interface 480. The software instructions contained in main memory 430 may cause processing unit 420 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Exemplary Computer-Readable Medium

Figure 5:
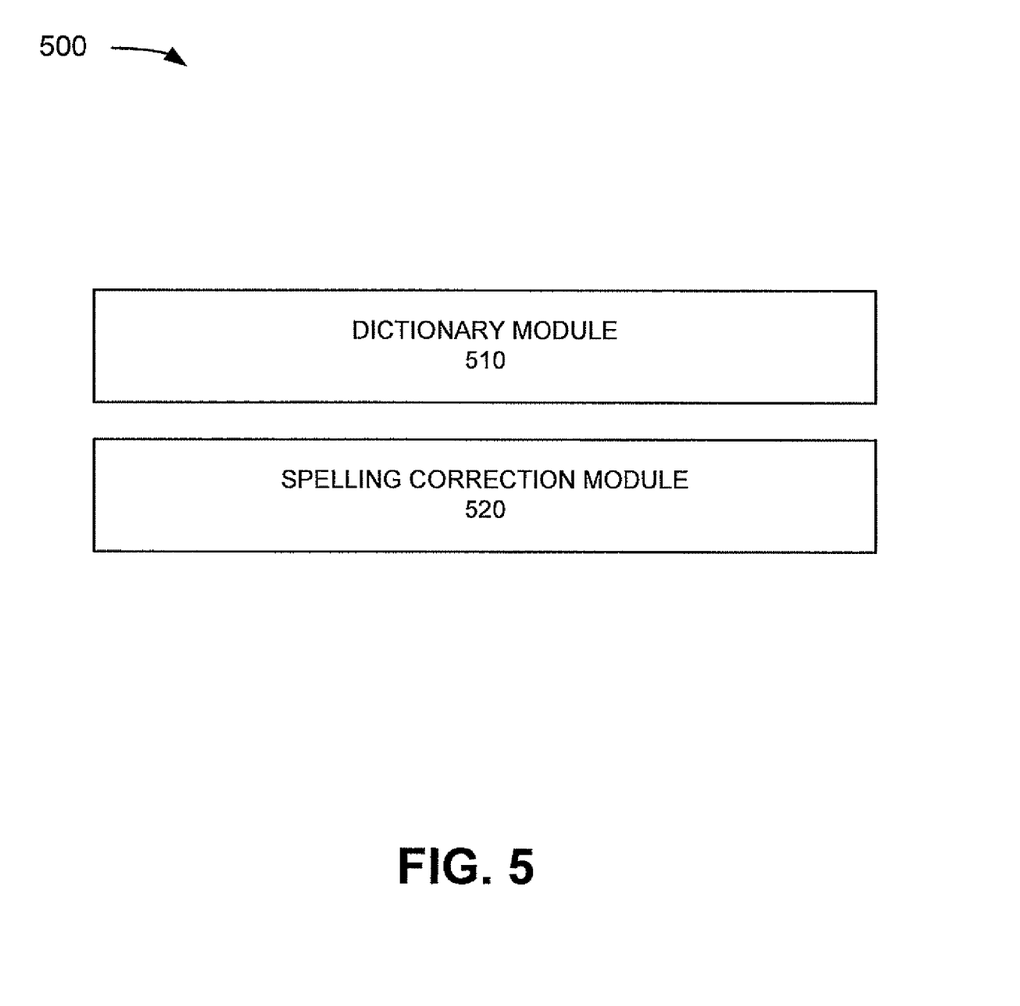
FIG. 5 is a diagram of a portion of an exemplary computer-readable medium that may be associated with the server of FIGS. 1 and 4 in an implementation consistent with principles of the invention.

FIG. 5 is a diagram of a portion of an exemplary computer-readable medium 500 that may be associated with server 120 in an implementation consistent with principles of the invention. In one implementation, computer-readable medium 500 may correspond to main memory 430 of server 120. The portion of computer-readable medium 500 illustrated in FIG. 5 may include a dictionary module 510 and a spelling correction module 520.

Dictionary module 510 may store a list of correctly spelled words. Spelling correction module 520 may correct misspellings. When a term is received, spelling correction module 520 may compare the received term to the words in the list of correctly spelled words maintained by dictionary module 510. If the received term does not match a word in the list of correctly spelled words, spelling correction module 520 may identify a word that most closely matches the received term. In one implementation, spelling correction module may use a weighted edit distance (or Levenshtein distance) technique to determine the closest matching word, where the weights may be selected based on the geometry of the input device associated with the user device from which the term was received. In one exemplary implementation, a weight of "1" may be given to substitutions of characters that occur on the same key of keypad 250 and a weight of "2" may be given to any other substitution, insertion, or deletion.

As an example of this type of weighting, assume that a user triple taps the term "hoke" on keypad 250 of user device 110. Possible correct spellings of this term include "hope," "hole," "home," "hone," "hove," "hose," and "hike." According to the above exemplary weighting technique, "hope" would be given a weight of "2" because the letter "p" does not occur on the same key of keypad 250 as the letter "k," "hole" would be given a weight of "1" because the letter "1" occurs on the same key of keypad 250 as the letter "k," "home" would be given a weight of "2" because the letter "m" does not occur on the same key of keypad 250 as the letter "k," "hone" would be given a weight of "2" because the letter "n" does not occur on the same key of keypad 250 as the letter "k," "hove" would be given a weight of "2" because the letter "v" does not occur on the same key of keypad 250 as the letter "k," "hose" would be given a weight of "2" because the letter "s" does not occur on the same key of keypad 250 as the letter "k," and "hike" would be given a weight of "2" because the letter "i" does not occur on the same key of keypad 250 as the letter "o." Thus, the word "hole" would be selected as the correct word over "hope," "home," "hone," "hove," "hose," and "hike" because of the weighting.

In a second exemplary implementation, a weight of "1" may be given to substitutions of characters that occur on the same key of keypad 250, a weight of "2" may be given to substitutions of characters that occur on keys that are adjacent to the key of keypad 250 that was used to enter the character that is being replaced, and a weight of "3" (or a combination of weights, including weights that equal or exceed "3") may be given to any other substitution, insertion, or deletion. Other weighting techniques may alternatively be used that take into account the geometry of the input device used by the user to enter the text into user device 110. Variants of edit distance and/or other techniques may alternatively be used.

Exemplary Processing

Figure 6:
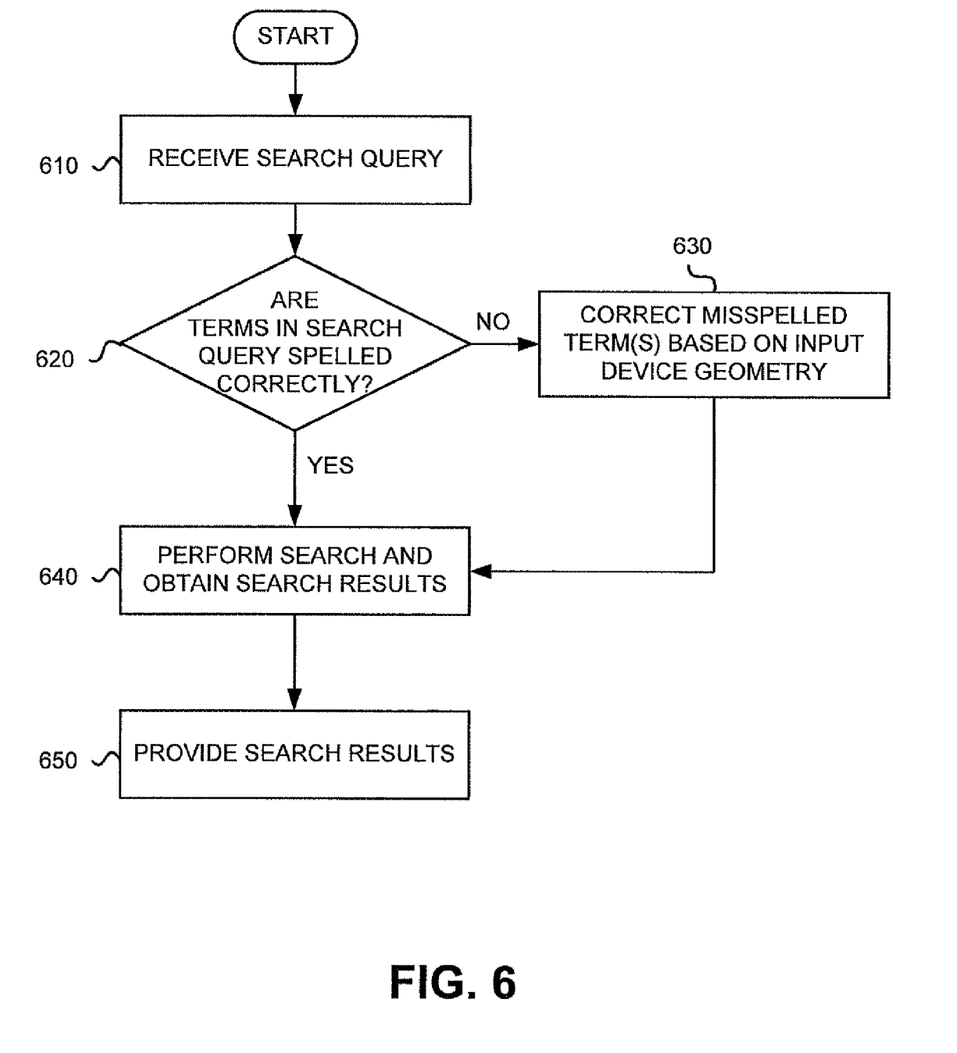
FIG. 6 is a flow chart of an exemplary process for performing a text search in an implementation consistent with principles of the invention.

FIG. 6 is a flow chart of an exemplary process for performing a text search in an implementation consistent with principles of the invention. In one implementation, the processing of FIG. 6 may be performed by one or more software and/or hardware components within server 120. In another implementation, some or all of the processing may be performed by one or more software and/or hardware components within another device (such as user device 110) or a group of devices separate from or including server 120. While the following processing focuses on correcting incorrectly spelled terms in a search query, it will be appreciated that the spelling correction techniques described herein are equally applicable to other scenarios in which a user may desire that spelling corrections be made. For example, the spelling correction techniques described herein may be implemented within user device 110 to correct spelling in text messaging, word processing, etc.

Processing may begin with server 120 receiving a search query (block 610). For example, a user may enter a search query into user device 110 using keypad 250 and may cause user device 110 to transmit the search query to server 120. User device 110 may transmit the search query using Short Messaging Service (SMS) or another transmission technique.

Server 120 may determine whether the terms in the search query are correctly spelled (block 620). Server 120 may, for example, make this determination by comparing each term in the search query to the list of correctly spelled words maintained by dictionary module 510. If a term does not match a word in the list of correctly spelled words, the term may be considered to be misspelled. If server 120 determines that a term in the search query is incorrectly spelled (block 620— NO), server 120 may correct the misspelled term based on the geometry of the input device used to enter the search query on user device 110 (block 630). In one implementation, server 120 may use a weighted edit distance technique to select the correctly spelled word, where the weighting is based on the geometry of the input device (e.g., keypad 250) used to enter the text into user device 110. For example, a weight of "1" may be given to substitutions of characters associated with the same key of keypad 250 and a weight of "2" may be given to any other substitution, insertion, or deletion. As another example, a weight of "1" may be given to substitutions of characters associated with the same key of keypad 250, a weight of "2" may be given to characters associated with keys that are adjacent to the key of keypad 250 that was used to enter the character that is being replaced, and a weight of "3" (or a combination of weights, including weights that equal or exceed "3") may be given to any other substitution, insertion, or deletion. Server 120 may select a correctly spelled word using the weighted edit distance technique to form a corrected search query.

If the terms in the search query are correctly spelled (block 620—YES) or after server 120 corrects incorrectly spelled terms in the search query (block 630), server 120 may perform a search in a well-known manner using the original search query or the corrected search query (block 640). Server 120 may perform the search itself or may transmit the original or corrected search query to a search engine. The search may include an Internet search or a search of a predetermined database. Server 120 may then obtain search results in response to performing a search using the original or corrected search query (block 640). Server 120 may then provide the search results to user device 110 (block 650). The search results may be displayed to the user via display 230. In this way, improved search results may be provided to the user that are relevant to the search query that the user typed or intended to type.

Example

Figure 7:
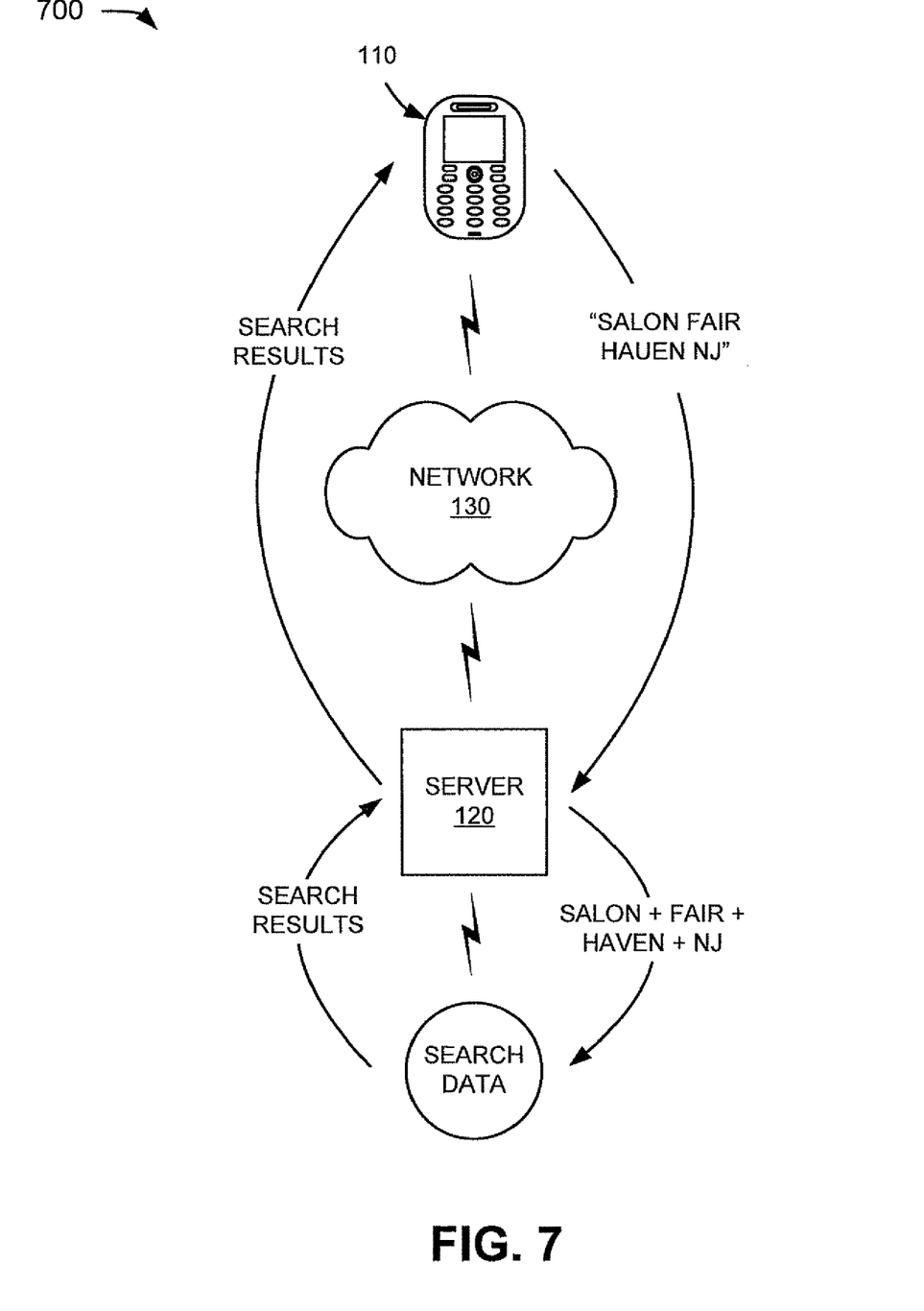
FIG. 7 provides an example of the processing described above with respect to FIG. 6.

The following example 700 illustrates the processing described above with respect to FIG. 6. In this example 700, assume, as illustrated in FIG. 7, that a user of user device 110 triple taps in the search query "SALON FAIR HAUEN NJ" and transmits this search query to server 120. Server 120 may receive the search query and compare each term in the search query to words in the list of correctly spelled words maintained by dictionary module 510. Server 120 may determine that the term "HAUEN" is incorrectly spelled. Assume that server 120 determines that possible correct spellings of the term "HAUEN" include "HAGEN" and "HAVEN." Using the weighted edit distance technique according to an implementation consistent with the principles of the invention, "HAGEN" would be given a weight of "2" because the letter "G" does not occur on the same key of keypad 250 as the letter "U" and "HAVEN" would be given a weight of "1" because the letter "V" occurs on the same key of keypad 250 as the letter "U." Thus, the word "HAVEN" would be selected as the correct word over "HAGEN" using the weighted edit distance technique according to principles of the invention. Server 120 may then use the corrected search query "SALON FAIR HAVEN NJ" to perform a search, such as an Internet search or predetermined database search. Server 120 may obtain search results based on the corrected search query and return the search results to user device 110.

CONCLUSION

Implementations consistent with principles of the invention may correct misspellings based on the geometry of an input device via which text is entered.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while the above description focuses on text being entered via a keypad, it will be appreciated that the spelling correction techniques described herein are equally applicable to text being entered via a keyboard or another type of input device. When a keyboard is the input device, weights may be assigned to characters based on the physical distance of the character on the keyboard being substituted into the term from the character being replaced.

As an example, assume that server 120 receives the term "gane." Possible candidates for the term may include "gone," "gate," "gage," "game," "gale," and "gape." The candidates involve substituting the letter "o" for the letter "a" and substituting the letters "t," "g," "m," "l," and "p" for the letter "n." The letters adjacent to the letter "a" on the keyboard are the letters "q," "w," "s," and "z." Thus, in the substitution of letter "a" for another letter, the letters "q," "w," "s," and "z" would be given a weight of "1" and letters that are physically further away from the letter "a" on the keyboard may be given a weight that is greater than "1." Similarly, the letters adjacent to the letter "n" on the keyboard are the letters "h," "j," and "m." Thus, in the substitution of letter "n" for another letter, the letters "h," "j," and "m" would be given a weight of "1" and letters that are physically further away from the letter "n" on the keyboard may be given a greater weight than "1." Under this weighting scheme, server 120 may give a weight of "1" to the word "game" and a weight greater than "1" to all of the other possible candidates. Thus, server 120 would determine that the word "game" is the most likely candidate for replacing the term "gane."

While a series of acts have been described with regard to FIG. 6, the order of the acts may be modified in other implementations consistent with principles of the invention. Further, non-dependent acts may be performed in parallel.

It will be apparent that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A the method comprising:
   receiving a term via a device having a keypad;
   assigning weights to characters in a first spelling of the term using a weighted distance technique based on a geometry of the keypad, to change the first spelling of the term;
   wherein in the weighted distance technique: a first weight is assigned to substitution of a character in the first spelling based on a physical distance on the keypad, between a key associated with a substitute character and a key associated with the character in the first spelling of the term;
   wherein a second weight is assigned to an insertion or deletion of a character in the first spelling of the term;
   identifying a second spelling for the term based on the weights assigned to the character in the weighted distance technique and;
   wherein a third weight is assigned to substitutions of character associated with keys that are adjacent to a key associated with a character in the first spelling that is being replaced.

2. The method of claim 1 wherein the first spelling is an incorrect spelling of the term and the second spelling is a correct spelling of the term.

3. The method of claim 1 further comprising, identifying the second spelling by
   selecting the second spelling from a plurality of correctly spelled terms when the second spelling involves a substitution of a character in the first spelling of the term with another character that is associated with a same key on the keypad.

4. The method of claim 1 wherein the term is received as part of a search query.

5. The method of claim 4 further comprising:
   performing a search using the term having the second spelling to obtain search results.

6. A device comprising:
   a memory having stored therein instructions;
   a processor to execute the instruction to:
   assigning weights to characters in a first spelling of the term using a weighted distance technique based on a geometry of the keypad through which the term is input, to change the first spelling of the term;
   wherein in the weighted distance technique:
   a first weight is assigned to substitution of a character in the first spelling based on a physical distance on the keypad, between a key associated with a substitute character and a key associated with the character in the first spelling of the term;

wherein a second weight is assigned to an insertion or deletion of a character in the first spelling of the term;

identify a second spelling for the term based on the weights assigned to the character in the weighted distance technique and;

wherein a third weight is assigned to substitutions of character associated with keys that are adjacent to a key associated with a character in the first spelling that is being replaced.

7. The network device of claim 6 wherein the term is input via a cell phone.

8. The network device of claim 6 wherein the key associated with the substitute character is adjacent to the key associated with the character in the first spelling of the term being replaced.

9. The network device of claim 6 wherein the processor receives the term as part of a search query.

10. The network device of claim 6 wherein the processor is further configured to:

perform a search using the term with the second spelling to obtain search results.

* * * * *